US008638658B2

(12) United States Patent
Murayama et al.

(10) Patent No.: US 8,638,658 B2
(45) Date of Patent: Jan. 28, 2014

(54) DATA TRANSMISSION DEVICE

(75) Inventors: Shu Murayama, Tokyo (JP); Masahiro Abukawa, Tokyo (JP); Takeshi Mitsui, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 120 days.

(21) Appl. No.: 13/143,806

(22) PCT Filed: May 29, 2009

(86) PCT No.: PCT/JP2009/002389
§ 371 (c)(1),
(2), (4) Date: Jul. 8, 2011

(87) PCT Pub. No.: WO2010/079538
PCT Pub. Date: Jul. 15, 2010

(65) Prior Publication Data
US 2011/0273978 A1    Nov. 10, 2011

(30) Foreign Application Priority Data

Jan. 8, 2009   (JP) ................................. 2009-002518

(51) Int. Cl.
*G01R 31/08*    (2006.01)
(52) U.S. Cl.
USPC ......................................................... 370/216
(58) Field of Classification Search
None
See application file for complete search history.

(56) References Cited

U.S. PATENT DOCUMENTS

| 4,764,920 | A | 8/1988 | Furuya | |
|---|---|---|---|---|
| 2004/0063430 | A1* | 4/2004 | Cave et al. | 455/436 |
| 2004/0174853 | A1* | 9/2004 | Saito et al. | 370/338 |
| 2008/0144493 | A1* | 6/2008 | Yeh | 370/230 |
| 2008/0212547 | A1* | 9/2008 | Sugaya et al. | 370/338 |
| 2008/0285514 | A1 | 11/2008 | Uchida et al. | |
| 2010/0008338 | A1* | 1/2010 | Tsfati et al. | 370/338 |
| 2010/0074198 | A1* | 3/2010 | Morioka | 370/329 |
| 2010/0311455 | A1* | 12/2010 | Armstrong et al. | 455/512 |

FOREIGN PATENT DOCUMENTS

| JP | 08 009476 | 1/1996 |
|---|---|---|
| JP | 11 15325 | 1/1999 |
| JP | 2007 129570 | 5/2007 |
| JP | 2007 184833 | 7/2007 |
| JP | 2008 042730 | 2/2008 |
| JP | 2008 59577 | 3/2008 |
| JP | 2008 312194 | 12/2008 |

OTHER PUBLICATIONS

International Search Report issued Jul. 7, 2009 in PCT/JP09/002389 filed May 29, 2009.
European Search Report issued Sep. 27, 2013 in European Patent Application No. 09837428.3.

* cited by examiner

*Primary Examiner* — John Blanton
(74) *Attorney, Agent, or Firm* — Oblon, Spivak, McClelland, Maier & Neustadt, L.L.P.

(57) ABSTRACT

A data transmission device is provided including a monitoring unit 2 for monitoring a transmission time period of data and predicting a transmission timing with which the above-mentioned data will be transmitted next time from the transmission time period. The data transmission device delays the transmission timing of data in the data transmission device when the transmission timing of the data in the data transmission device is close to a transmission timing predicted by the monitoring unit 2, whereas commands a network I/F unit 1 to transmit the data in the data transmission device when the transmission timing of the data in the data transmission device is not close to the predicted transmission timing.

12 Claims, 3 Drawing Sheets

| ID | Transmission Time Period | Newest Transmission Time | Predicted Next Transmission Time |
|---|---|---|---|
| 70h | 40 | 1000 | 1040 |
| 80h | 100 | 1010 | 1110 |
| 50h | 200 | 1100 | 1300 | ns
DATA TRANSMISSION DEVICE

FIELD OF THE INVENTION

The present invention relates to a data transmission device, such as a gateway device located between a control system network and an information system network in a vehicle-mounted network, for example. More particularly, it relates to a data transmission device that transmits data having a low priority while not obstructing transmission of data having a higher priority as much as possible.

BACKGROUND OF THE INVENTION

Recently-used communications within vehicles have remarkable progress in networking.

Engine control, control of door mirrors and power windows, etc. are carried out by connecting between a plurality of control units in the network to enable the plurality of control units to exchange required information with one another.

Furthermore, construction of an in-vehicle network is in progress also for data in an information system which are information other than control information for vehicles.

For example, in a case of displaying a video image of a DVD player disposed for a front seat on an screen of a backseat, and in a case of outputting a sound from a speaker disposed at any one of places in the vehicle, the wiring number can be reduced by introducing networking rather than connecting between related devices individually.

Generally, the former network is referred to as a control system network, and the latter network is referred to as an information system network. Because requirements for networks, such as reliability and bandwidth, differ between the control system network and the information system network, they are constructed as physically-separate networks.

On the other hand, fusion of the control system network and the information system network contributes to the enhancement of the vehicle system greatly.

For example, thinking about a system which carries out control of a brake or a steering according to a video image captured by a vehicle-mounted camera, it is necessary to propagate data which are transmitted to an information system network to a control system network via a gateway device.

However, as mentioned above, because the control system network is a system which requires high reliability, simple filtering of the data which are transmitted to the information system network to flow the data into the control system network is inadequate. More specifically, it is necessary to take a measure of not obstructing communications in the control system network.

In the case of CAN (Controller Area Network) which is a system used widely for the control system network of a vehicle, there exists a mechanism for assigning a priority to data (a message).

For example, there is a mechanism for cancelling transmission of a message having a low priority when the transmission timings of a plurality of messages coincide with one another and these messages collide with one another.

However, when the transmission of the message having a low priority is started previously, a transmitting process of transmitting a message having a high priority is kept waiting until the transmission of the message having a low priority is completed.

In the control system network of a vehicle, there are many messages which are transmitted at predetermined periods. Therefore, a control system for avoiding collision of messages by using this feature is disclosed by the following patent reference 1.

In this control system, a device which serves as a master (referred to as a "master device" from here on) is prepared on the network, and the master device receives a list showing the transmission time periods of outgoing messages from a plurality of other devices (each referred to as a "slave device" from here on) and counts the transmission time period of each outgoing message, and, when the transmission time period of one of the outgoing messages coincides with that of another outgoing message, commands the corresponding slave devices to shift the phases of the transmission time periods.

In this case, each slave device needs to implement a function of changing the transmission timing of its outgoing message according to the command from the master device.

RELATED ART DOCUMENT

Patent Reference

Patent reference 1: JP, 2007-184833, A (paragraph number [0008] and FIG. 1)

SUMMARY OF THE INVENTION

Because the conventional data transmission device is constructed as mentioned above, collision between outgoing messages can be avoided as long as each slave device implements a function of changing the transmission timing of its outgoing message according to the command from the master device. However, all data which are transmitted in the network do not necessarily have transmission time periods which are determined from the start, and there is a case in which the transmission time period of data are determined for the first time in response to a certain trigger. A problem with the conventional data transmission device is that it cannot deal with such a case.

The system structure of the conventional data transmission device becomes complicated because it is necessary to incorporate the master device into the system. A further problem is that because it is necessary to transmit a list showing the transmission time periods of outgoing messages to the master device in advance, the network band is narrowed by an amount corresponding to the transmission.

The present invention is made in order to solve the above-mentioned problems, and it is therefore an object of the present invention to provide a data transmission device that can transmit data in the data transmission device with a timing which does not obstruct communications of data for which a transmission time period is unknown in advance.

In accordance with the present invention, a data transmission device includes: a network interface unit for carrying out a process of transmitting and receiving data to and from a network, and for detecting data which are being transmitted in the network and notifying an identifier assigned to the data and a transmission timing of the data; and a transmission timing prediction unit for recording the transmission timing of the data notified from the network interface unit according to the identifier, and for monitoring a transmission time period of data to which the same identifier is assigned and predicting a transmission timing with which the above-mentioned data will be transmitted next time from the transmission time period, and delays a transmission timing of data in the data transmission device when the transmission timing of the data in the data transmission device is close to a transmission timing predicted by the transmission timing prediction unit, whereas commands the network interface unit to transmit the data in the data transmission device when the transmission timing of the data in the data transmission device is not close to the predicted transmission timing.

Because the data transmission device in accordance with the present invention includes the network interface unit for carrying out a process of transmitting and receiving data to and from a network, and for detecting data which are being transmitted in the network and notifying an identifier assigned to the data and a transmission timing of the data, and the transmission timing prediction unit for recording the transmission timing of the data notified from the network interface unit according to the identifier, and for monitoring a transmission time period of data to which the same identifier is assigned and predicting a transmission timing with which the above-mentioned data will be transmitted next time from the transmission time period, and delays the transmission timing of data in the data transmission device when the transmission timing of the data in the data transmission device is close to a transmission timing predicted by the transmission timing prediction unit, whereas commands the network interface unit to transmit the data in the data transmission device when the transmission timing of the data in the data transmission device is not close to the predicted transmission timing, there is provided an advantage of being able to transmit the data in the data transmission device at the timing which does not obstruct communications of data for which a transmission time period is unknown in advance.

EMBODIMENTS OF THE INVENTION

Hereafter, in order to explain this invention in greater detail, the preferred embodiments of the present invention will be described with reference to the accompanying drawings.

Embodiment 1

Figures 1, 2:
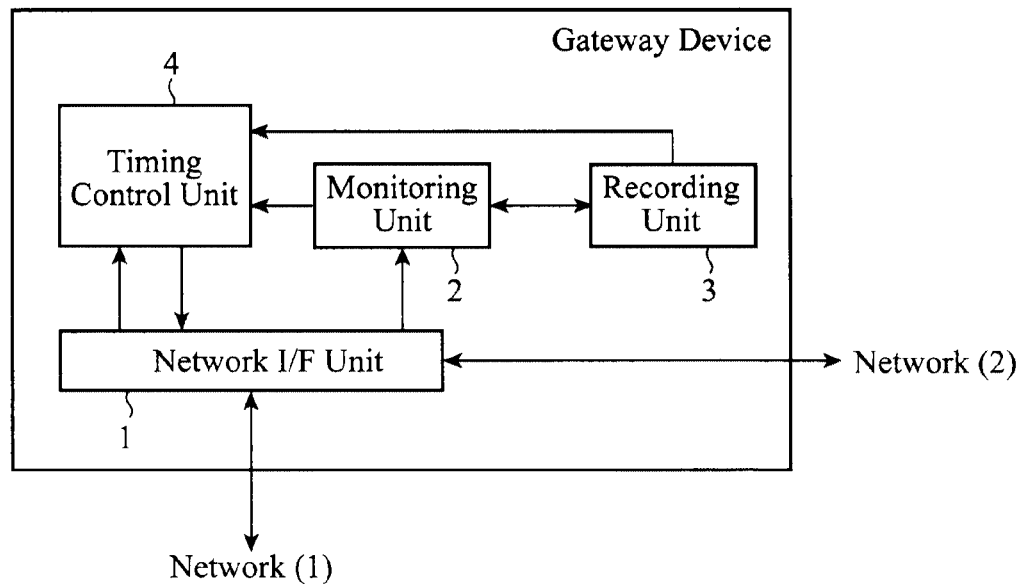
FIG. 1 is a block diagram showing data transmission device in accordance with Embodiment 1 of the present invention.
FIG. 2 is an explanatory drawing showing the recorded contents of a table in a recording unit 3.

FIG. 1 is a block diagram showing a data transmission device in accordance with Embodiment 1 of the present invention.

The data transmission device shown in FIG. 1 is an example of a gateway device which is located between a control system network and an information system network in a vehicle-mounted network.

As shown in FIG. 1, a network I/F unit 1 is connected to a network (1) and a network (2), and carries out a process of transmitting and receiving data to and from each of the networks (1) and (2), and also carries out a process of detecting data which are being transmitted in the network (1) or (2) to notify an ID (identifier) assigned to the data, and the transmission timing (transmission time) of the data to a monitoring unit 2. The network I/F unit 1 constructs a network interface unit.

The monitoring unit 2 carries out a process of recording the transmission timing of the data notified from the network I/F unit 1 into a table of a recording unit 3 according to the ID, monitoring the transmission time period of data to which the same ID is assigned, and predicting the transmission timing (transmission time) with which the above-mentioned data will be transmitted the next time from the transmission time period.

The recording unit 3 is a memory in which a table showing the transmission time period and the newest transmission time of data, and a predicted transmission time at which the data will be transmitted the next time is recorded according to the ID of the data.

A transmission timing prediction unit is comprised of the monitoring unit 2 and the recording unit 3.

A timing control unit 4 carries out a process of delaying the transmission timing of data in the data transmission device when the predicted next transmission times recorded into the table in the recording unit 3 includes a predicted next transmission time which is close to the transmission timing (transmission time) of data in the data transmission device, whereas when there is no predicted next transmission time which is close to the transmission timing of data in the data transmission device, commanding the network I/F unit 1 to transmit the data in the data transmission device. The timing control unit 4 constructs a transmission timing control unit.

Next, the operation of the data transmission device will be explained.

The network I/F unit 1 is connected to the network (1) and the network (2), and carries out a gateway process of transmitting data received from one of the networks to the other network.

Although the network I/F unit typically performs a certain conversion process on the received data at this time, the conversion process is not related to the explanation of the present invention and therefore the explanation of the conversion process will be omitted.

In this embodiment, for the sake of simplicity, a case in which when data received from the network (2) are transmitted, as data in the data transmission device, to the network (1), a measure of preventing the transmission from obstructing communications of data transmitted in the network (1) is taken will be explained.

The network I/F unit 1 carries out a detecting process of detecting data flowing in the network (1).

When detecting data flowing in the network (1), the network I/F unit 1 notifies an ID assigned to the data and the transmission time which is the transmission timing of the data (the detected time of the data) to the monitoring unit 2.

For example, in a case in which CAN is used, because an ID (having 11 bits or 29 bits) is assigned to the header part of the data, the network I/F unit reads the ID in the header part, and notifies the ID to the monitoring unit.

When receiving the notification of the ID and the transmission timing of the data from the network I/F unit 1, the monitoring unit 2 records them into the table in the recording unit 3 according to the ID by setting the transmission timing to the newest transmission time.

FIG. 2 is an explanatory drawing showing the recorded contents of the table in the recording unit 3.

FIG. 2 shows an example in which the transmission time periods, the newest transmission times, and the predicted next transmission times of three data are recorded.

When recording the transmission timing of data, as the newest transmission time, into the table, the monitoring unit 2 calculates, as the transmission time period, the difference between the transmission timing which is notified thereto the last time (the newest transmission time currently recorded in the table), and the transmission timing which is notified this time (the newest transmission time), and records the transmission time period into the table.

The monitoring unit 2 also adds the transmission time period to the transmission timing (the newest transmission time) which is notified this time to record the result of the addition into the table as the predicted next transmission time.

For example, the data with ID=70h has the transmission time period of "40", the newest transmission time of "1000", and the predicted next transmission time of "1040".

When the transmission timing of data in the data transmission device comes, the timing control unit 4 determines whether or not there is a predicted next transmission time, among the predicted next transmission times recorded in the table in the recording unit 3, which is close to the transmission timing (transmission time) of the data in the data transmission device.

For example, if the transmission timing of the data in the data transmission device is a time=1035, the timing control unit determines whether or not there is a predicted next transmission time which is close to the time=1035.

In the example of FIG. 2, the predicted next transmission time which is the closest to the time=1035 is the predicted next transmission time=1040 of the data with ID=70h, and the time difference between them is "5" (=1040-1035).

At this time, when a threshold set for the time difference is "7", for example, the timing control unit determines that the transmission timing (transmission time) of the data in the data transmission device is close to the predicted next transmission time=1040 of the data with ID=70h because the time difference<the threshold.

In contrast, when the threshold set for the time difference is "3", for example, the timing control unit determines that there is no predicted next transmission time which is close to the transmission timing (transmission time) of the data in the data transmission device because the time difference>the threshold.

In this Embodiment 1, the threshold having an arbitrary value can be preset to the timing control unit 4.

When determining that there is no predicted next transmission time which is close to the transmission timing (transmission time) of the data in the data transmission device, the timing control unit 4 commands the network I/F unit 1 to transmit the data in the data transmission device.

In contrast, when determining that the transmission timing (transmission time) of the data in the data transmission device is close to the predicted next transmission time=1040 of the data with ID=70h, for example, the timing control unit 4 delays the transmission timing of the data in the data transmission device, and postpones the transmission of the data in the data transmission device until the transmission of the data with ID=70h is completed.

More specifically, when a time has elapsed and the time=1040 comes, and the data with ID=70h appears on the network (1), the monitoring unit 2 updates the newest transmission time and the predicted next transmission time of the data with ID=70h to "1040" and 1080" in the same way as that mentioned above. Therefore, the timing control unit 4 determines that there is no predicted next transmission time which is close to the transmission timing (transmission time) of the data in the data transmission device As a result, the timing control unit 4 commands the network I/F unit 1 to transmit the data in the data transmission device.

When receiving the command to transmit the data in the data transmission device from the timing control unit 4, the network I/F unit 1 transmits the data in the data transmission device to the network (1).

As can be seen from the above description, because the data transmission device in accordance with this Embodiment 1 is constructed in such a way that the data transmission device includes the network I/F unit 1 for carrying out a process of transmitting and receiving data to and from a network, and for detecting data which are being transmitted in the network and notifying the ID assigned to the data and the transmission timing of the data, and the monitoring unit 2 for recording the transmission timing of the data notified from the network I/F unit 1 according to the identifier, and for monitoring the transmission time period of data to which the same ID is assigned and predicting the transmission timing with which the above-mentioned data will be transmitted the next time from the transmission time period, and delays the transmission timing of data in the data transmission device when the transmission timing of the data in the data transmission device is close to a transmission timing predicted by the monitoring unit 2, whereas commands the network I/F unit 1 to transmit the data in the data transmission device when the transmission timing of the data in the data transmission device is not close to the predicted transmission timing, this embodiment provides an advantage of being able to transmit the data in the data transmission device with the timing which does not obstruct communications of data for which a transmission time period is unknown in advance.

Because the gateway device cannot sufficiently grasp the state of data flowing in the network (1) immediately after the gateway device is started, it is desirable that the timing control unit 4 determines whether or not to transmit the data in the data transmission device after the monitoring unit 2 updates the table in the recording unit 3 during a fixed time period.

Although in this Embodiment 1 the example in which the transmission time period of data is recorded into the table according to the ID of the data is shown, a plurality of values or a range of values associated with the transmission time period, such as an average, a maximum and a minimum of transmission time periods, can be alternatively recorded in consideration of variations in the transmission time period.

In this case, a plurality of values or a range of values can be recorded as the predicted next transmission time.

Furthermore, although in this Embodiment 1 the example in which CAN is used is shown, this embodiment does not depend on a specific protocol and can be applied to another network as long as data which are desired to be transmitted without being obstructed has periodicity, and it can be detected that the data are flowing in the network.

Furthermore, although in this Embodiment 1 the example in which the data transmission device is a gateway device and the network I/F unit 1 is connected to the two networks (1) and (2) is shown, the network I/F unit 1 can be connected only to the network (1) and the data transmission device can transmit data created thereby to the network (1) with an arbitrary timing.

Embodiment 2

In above-mentioned Embodiment 1, although the example in which the monitoring unit 2 updates the table in the recording unit 3 is shown, the size of the table in the recording unit 3 increases with increase in the type of data flowing in the network (1), and a large amount of storage is needed according to the increase while the amount of information to be processed required for a table search by the timing control unit 4 may increase. Because this results in a possibility that there occurs a delay in the process of implementing a gateway from the network (2) to the network (1), a data transmission device in accordance with this Embodiment 2 is constructed in such a way as to narrow down data to be monitored by a monitoring unit 2.

Hereafter, a method of narrowing down data to be monitored will be explained concretely.

For example, because when the transmission timing of data in the data transmission device corresponds to a fixed time period, there is a high possibility that the transmission timing of data having a transmission time period which is the same as either the fixed time period or a common divisor of the fixed time period coincides with that of the data in the data transmission device, there can be considered a method of including only data having such a transmission time period into a target to be monitored.

In this case, a network I/F unit 1 notifies the transmission time period of the data in the data transmission device to the monitoring unit 2.

When receiving the notification of the transmission time period of the data in the data transmission device, the monitoring unit 2 selects only the ID and the transmission timing of data having a time period which is the same as either the transmission time period of the data in the data transmission device or a common divisor of the transmission time period from among the IDs and the transmission timings of data notified from the network I/F unit 1, and records the transmission timing (the newest transmission time) of the data into a table of a recording unit 3.

In a case of transferring data received from the network (2) to the network (1) just as they are, the data transmission device determines the transmission timing of the data which the data transmission device will transmit to the network (1) from the timing of the data received from the network (2). Therefore, when the data transmission device carries out the reception of the data at fixed time periods, the transmission timing of the data which the data transmission device transmits to the network (1) also correspond to a fixed time period, and the network I/F unit 1 notifies this fixed time period to the monitoring unit 2.

Furthermore, there is another method of narrowing down the target to be monitored, as will be shown below.

There is a high possibility that data detected by the network I/F unit 1 on the network (1) immediately after the network I/F unit 1 has transmitted the data in the data transmission device to the network (1) has been waiting for completion of the transmitting process of transmitting the data in the data transmission device.

Therefore, immediately after the network I/F unit 1 has transmitted the data in the data transmission device to the network (1), the monitoring unit 2 includes the data detected by the network I/F unit 1 on the network (1) into the target to be monitored to monitor the transmission time period of the data.

Concretely, the data transmission device operates as follows.

Figure 3:
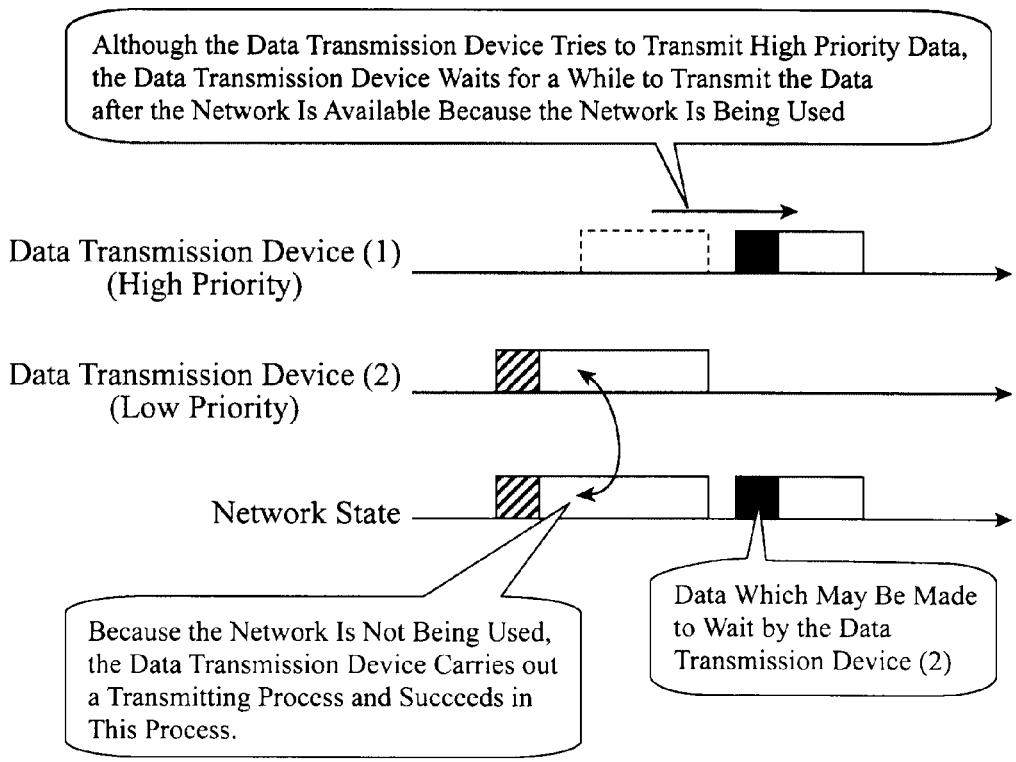
FIG. 3 is an explanatory drawing showing a state in which two data transmission devices (1) and (2) transmit data having a high priority and data having a low priority, respectively.

FIG. 3 is an explanatory drawing showing a state in which two data transmission devices (1) and (2) transmit data having a high priority and data having a low priority, respectively.

Each of the data transmission devices (1) and (2) checks the state of the network before transmitting the data, and transmits the data when the network is not used.

In the example of FIG. 3, because the transmission timing comes at an earlier time in the data transmission device (2) and the network is in an unused state, the data transmission device (2) actually transmits the data having a low priority.

Furthermore, in the example of FIG. 3, although while this data having a low priority is transmitted, the transmission timing comes in the data transmission device (1), the data transmission device (1) is kept waiting until the network enters an available state because the network is being used.

Then, when the transmission of the data having a low priority by the data transmission device (2) is completed, the data transmission device (1) transmits the data thereof having a high priority.

At this time, in a case in which the data transmission device (2) is a gateway device in accordance with this Embodiment 2, the data transmission device (2) can detect the data having a high priority transmitted by the data transmission device (1) on the network immediately after completing the transmission of the data.

There is a possibility that this data are the one which have been made to wait for completion of the transmission of the data having a low priority by the data transmission device (i.e., the data which may be obstructed by the gateway device).

Therefore, in order to prevent the data having a high priority from being obstructed after that, the data having a high priority of the data transmission device (1) are added to the target to be monitored.

More specifically, immediately after the network I/F unit 1 transmits the data in the data transmission device to the network, the monitoring unit 2 includes the data detected by the network I/F unit 1 on the network into the target to be monitored, and monitors the transmission time period of the data.

Furthermore, there is another method of narrowing down the target to be monitored, as will be shown below.

When the transmission of the data in the data transmission device to the network (1) has failed, the data detected by the network I/F unit 1 on the network (1) mean that the transmission timing of the data has coincided with that of the data in the data transmission device.

Therefore, when the transmission of the data in the data transmission device to the network (1) has failed, the monitoring unit 2 includes the data detected by the network I/F unit 1 on the network into the target to be monitored, and monitors the transmission time period of the data.

Concretely, the data transmission device operates as follows.

Figure 4:
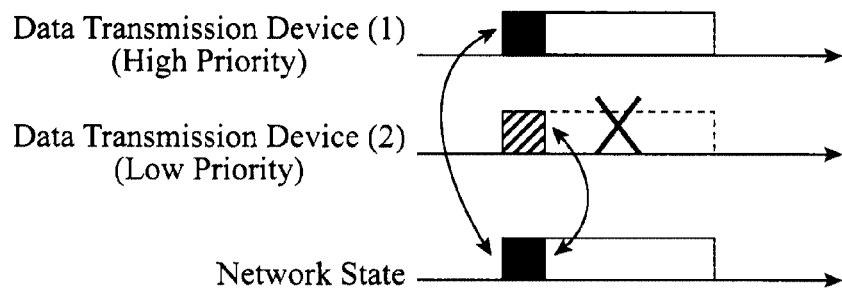
FIG. 4 is an explanatory drawing showing a state in which the transmission timings of the two data transmission devices (1) and (2) coincide with each other.

FIG. 4 is an explanatory drawing showing a state in which the transmission timings of two data transmission devices (1) and (2) coincide with each other.

FIG. 4 shows that when the data transmission device (2) is a gateway device in accordance with this Embodiment 2, while the data transmission device fails in transmission of the data thereof because the transmission timing of the data coincides with that of data having a high priority, the data transmission device can detect other data on the network.

Although no problem is presented in this example because the gateway device does not obstruct the transmission of any other data, there is a high possibility that at the next transmission the transmission timing of the gateway device coincides with that of the data transmission device (1) because their previous transmission times coincide with each other.

At that time, even when a fluctuation occurs in both the transmission timings and the transmission timing of the gateway device is advanced only by a short period of time, there is a high possibility that the data transmission device (1) is made to wait to carry out transmission of the data, as shown in FIG. 3.

Therefore, in order to prevent such a situation as shown in FIG. 3 from occurring, the data transmission device should also add the data detected on the network to the target to be monitored when failing in the transmission of the data thereof.

Therefore, when failing in the transmission of the data thereof from the network I/F unit 1, the data transmission device notifies the ID and the transmission timing of the data which are detected on the network to the monitoring unit 2, and the monitoring unit 2 includes the data into the target to be monitored and monitors the transmission time period of the data.

In this embodiment, although some methods of narrowing down the target to be monitored are shown, it is not necessary to select only one method from the methods and a combination of a plurality of methods can be used.

As can be seen from the above description, the data transmission device in accordance with this Embodiment 2 is constructed in such a way that the monitoring unit 2 includes data having a transmission time period which is the same as either the transmission time period of data in the data transmission device or a common divisor of the transmission time period into the target to be monitored, and monitors the transmission time period of the data, there is provided an advantage of being able to reduce the volume of the table in the recording unit 3 while reducing the amount of information to be processed required for an update of the table and a search through the table. There is provided another advantage of being able to suppress the processing delay of the gateway by virtue of the reduction in the amount of information to be processed.

Furthermore, because the monitoring unit 2 in accordance with this Embodiment 2 is constructed in such a way as to include data detected by the network I/F unit 1 into the target to be monitored, and monitor the transmission time period of the data immediately after the network I/F unit 1 transmits the data in the data transmission device, there is provided an advantage of being able to reduce the volume of the table in the recording unit 3 while reducing the amount of information to be processed required for an update of the table and a search through the table. There is provided another advantage of being able to suppress the processing delay of the gateway by virtue of the reduction in the amount of information to be processed.

In addition, because the monitoring unit 2 in accordance with this Embodiment 2 is constructed in such a way as to, when the data transmission device fails in the transmission of the data in the data transmission device, include data detected by the network I/F unit 1 into the target to be monitored and monitor the transmission time period of the data, there is provided an advantage of being able to reduce the volume of the table in the recording unit 3 while reducing the amount of information to be processed required for an update of the table and a search through the table. There is provided another advantage of being able to suppress the processing delay of the gateway by virtue of the reduction in the amount of information to be processed.

Embodiment 3

Figure 5:
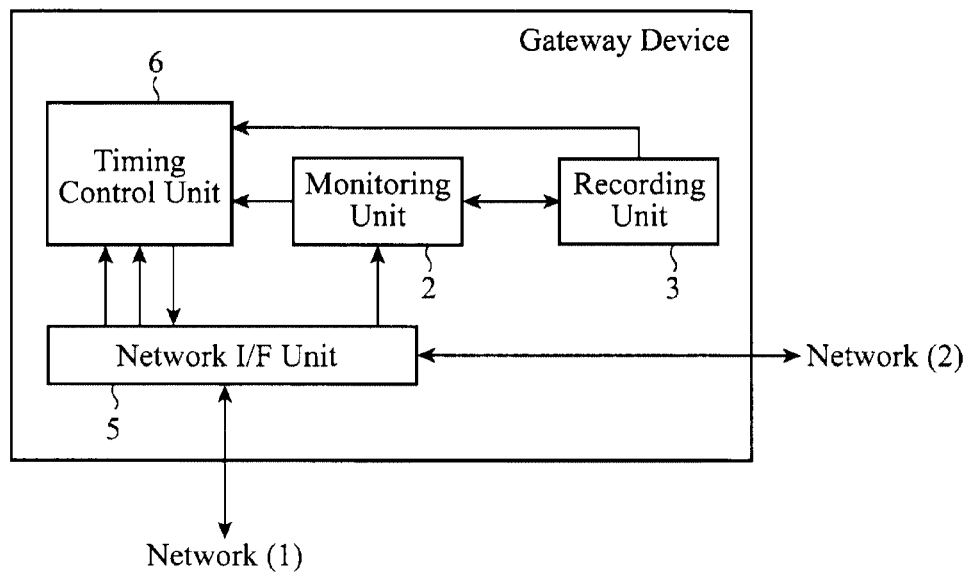
FIG. 5 is a block diagram showing a data transmission device in accordance with Embodiment 3 of the present invention.

FIG. 5 is a block diagram showing a data transmission device in accordance with Embodiment 3 of the present invention.

The data transmission device shown in FIG. 5 is an example of a gateway device which is located between a control system network and an information system network in a vehicle-mounted network. In FIG. 5, because the same reference numerals as those shown in FIG. 1 denote the same components or like components, the explanation of the components will be omitted hereafter.

A network I/F unit 5 carries out the same process as that performed by the network I/F unit 1 shown in FIG. 1 while carrying out a process of notifying the length (data length) of data received from a network (2) to a timing control unit 6 as data in the data transmission device, for example. The network I/F unit 5 constructs a network interface unit.

In this embodiment, although a case in which the network I/F unit 5 notifies the length of the data to the timing control unit 6 will be explained, the network I/F unit 5 can alternatively notify the length of the data to a monitoring unit 2 and store the length of the data in a table of a recording unit 3, and the timing control unit 6 can read the length of the data from the table.

The timing control unit 6 carries out a process of monitoring the transmission time period of data to predict the transmission timing (transmission time) with which the above-mentioned data are transmitted the next time from the transmission time period, like the timing control unit 4 of FIG. 1. At that time, the timing control unit calculates an occupation time zone in which a network (1) is occupied at the time of transmission of the data in the data transmission device from the network I/F unit 5 to the network (1) from both the length of the data in the data transmission device which is notified from the network I/F unit 5, and the bandwidth of the network (1), and, when the occupation time zone coincides with one transmission timing (one predicted next transmission time) predicted by the monitoring unit 2, determines that the transmission timing of the data in the data transmission device is close to the above-mentioned transmission timing. The timing control unit 6 constructs a transmission timing control unit.

Next, the operation of the data transmission device will be explained.

The network I/F unit 5 carries out a detecting process of detecting data flowing in the network (1), like the network I/F unit 1 of FIG. 1.

When detecting data flowing in the network (1), the network I/F unit 5 notifies the ID assigned to the data and the transmission time which is the transmission timing of the data (the detected time of the data) to the monitoring unit 2.

Furthermore, when receiving data which the data transmission device will transmit to the network (1) from the network (2), the network I/F unit 5 detects the length of the data and notifies the length of the data to the timing control unit 6.

When the transmission timing of the data in the data transmission device comes, the timing control unit 6 determines whether or not there is a predicted next transmission time, among the predicted next transmission times recorded in the table in the recording unit 3, which is close to the transmission timing (transmission time) of data in the data transmission device, like the timing control unit 4 of FIG. 1.

At this time, while when the time difference between the transmission timing (transmission time) of the data in the data transmission device and the predicted next transmission time (the predicted next transmission time within the table which is the closest to the transmission timing of the data in the data transmission device) is smaller than a predetermined threshold, the timing control unit 4 of FIG. 1 determines that the transmission timing of the data in the data transmission device is close to the predicted next transmission time, the timing control unit 6 in accordance with this Embodiment 3 determines whether or not the transmission timing of the data in the data transmission device is close to the predicted next transmission time in the following way.

More specifically, the timing control unit 6 calculates an occupation time period T during which the network (1) is occupied at the time of transmission of the data in the data transmission device from the network I/F unit 5 to the network (1) from both the length of the data in the data transmission device which is notified from the network I/F unit 5, and the bandwidth of the network (1).

For example, the occupation time period T during which the network (1) is occupied when the length of the data in the data transmission device is 8 bytes is four times as long as that when the length of the data in the data transmission device is 2 bytes.

A time zone between the current time and the time which is the addition of the occupation time period T to the current time is the occupation time zone Tw of the network (1) at the time of transmission of the data in the data transmission device to the network (1), and any other data cannot be transmitted on the network (1) during the occupation time zone Tw.

Therefore, when the occupation time zone Tw of the network (1) at the time of transmission of the data in the data transmission device to the network (1) coincides with one transmission timing (one predicted next transmission time) which is recorded in the table in the recording unit 3, the timing control unit 6 determines that the transmission timing of the data in the data transmission device is close to the above-mentioned transmission timing.

For example, when the occupation time zone Tw of the network (1) at the time of transmission of the data in the data transmission device to the network (1) is "1035-1042", because the occupation time zone Tw coincides with the predicted next transmission time=1040 of the data having ID=70h, the timing control unit 6 determines that the transmission timing of the data in the data transmission device is close to the transmission timing of the data having ID=70h.

In contrast, when the occupation time zone Tw of the network (1) at the time of transmission of the data in the data transmission device to the network (1) is "1035-1038", because any transmission timing (any predicted next transmission time) which coincides with the transmission timing of the data in the data transmission device is not recorded in the table, the timing control unit determines that there is no transmission timing (no predicted next transmission time) which is close to the transmission timing of the data in the data transmission device.

When determining that there is no predicted next transmission time which is close to the transmission timing (transmission time) of the data in the data transmission device, the timing control unit 6 commands the network I/F unit 5 to transmit the data in the data transmission device, like the timing control unit 4 of FIG. 1.

In contrast, when determining that the transmission timing (transmission time) of the data in the data transmission device is close to the predicted next transmission time=1040 of the data with ID=70h, for example, the timing control unit 6 delays the transmission timing of the data in the data transmission device, and postpones the transmission of the data in the data transmission device until the transmission of the data with ID=70h is completed.

As can be seen from the above description, the data transmission device in accordance with this Embodiment 3 is constructed in such a way as to calculate an occupation time zone Tw in which the network (1) is occupied at the time of transmission of data in the data transmission device from the network I/F unit 5 to the network (1) from both the length of the data in the data transmission device, and the bandwidth of the network (1), and, when the occupation time zone Tw coincides with one transmission timing (one predicted next transmission time) predicted by the monitoring unit 2, determine that the transmission timing of the data in the data transmission device is close to the above-mentioned transmission timing, the data transmission device can correctly determine whether the transmission timing of the data in the data transmission device coincides with the transmission timing of other data as compared with above-mentioned Embodiment 1. As a result, there is provided an advantage of being able to reduce the frequency with which the transmission of the data in the data transmission device enters a needless wait state, thereby improving the transmission efficiency of the network (1).

Embodiment 4

In above-mentioned Embodiments 1 to 3, the example in which the data transmission device delays the transmission timing of data in the data transmission device when the transmission timing of the data in the data transmission device is close to one transmission timing (one predicted next transmission time) which is recorded in the table in the recording unit 3 is shown. As an alternative, even when the transmission timing of the data in the data transmission device is close to one transmission timing (one predicted next transmission time) which is recorded in the table in the recording unit 3, the data transmission device delays the transmission timing of the data in the data transmission device only if the data in the data transmission device have a priority lower than that of the data which are to be transmitted with the transmission timing close to the transmission timing of the data in the data transmission device.

In other words, when the data in the data transmission device have a higher lower than that of the data which are to be transmitted with the transmission timing close to the transmission timing of the data in the data transmission device, the data transmission device can transmit the data in the data transmission device without delaying the transmission timing of the data in the data transmission device.

When the ID assigned to data is expressed by a numerical value showing the priority of the data (for example, in the case of CAN, the ID assigned to data shows the priority of the data, and data having a small value of ID have a higher priority than that of data having a larger value of ID), the timing control unit 4 (or 6) compares the numerical values of IDs between two data to determine which one of the two data has a higher priority.

When the transmission timing of the data in the data transmission device is close to one transmission timing (one predicted next transmission time) which is recorded into the table in the recording unit 3, the timing control unit 4 (or 6) delays the transmission timing of the data in the data transmission device if the data in the data transmission device have a priority lower than that of the data which are to be transmitted with the transmission timing close to the transmission timing of the data in the data transmission device.

In contrast, if the data in the data transmission device have a higher lower than that of the data which are to be transmitted with the transmission timing close to the transmission timing of the data in the data transmission device (including a case in which their priorities are the same as each other), the timing control unit commands the network I/F unit 1 (or 5) to transmit the data in the data transmission device without delaying the transmission timing of the data in the data transmission device.

In this embodiment, although the example in which the data transmission device determines the priority of data by comparing the ID assigned to the data with that assigned to other data is shown, in a case in which the network I/F unit 1 (or 5) is connected to a plurality of networks, the data transmission device can determine the priority of data from the priority of the network to which the data are to be transmitted.

Concretely, the data transmission device operates as follows.

For example, a case in which the network I/F unit 1 (or 5) is connected to three networks (1) to (3) is assumed.

Because it can be considered that a control system network typically has a higher priority than an information system network, in a case in which the network (1) is a control system network, the network (2) is an information system network, and the network (3) is a control system network, for example, it can be said that the networks (1) and (3) have a higher priority than the network (2).

Therefore, when data received from the network (2) having a lower priority are transmitted to the network (1) having a higher priority as data in the data transmission device, for example, the timing control unit 4 (or 6) delays the transmission timing of the data in the data transmission device when the transmission timing of the data in the data transmission device is close to one transmission timing (the transmission timing of data transmitted in the network (1)) which is recorded in the table in the recording unit 3, like that according to above-mentioned Embodiment 1.

In contrast, when data received from the network (3) having a higher priority are transmitted to the network (2) having a lower priority as data in the data transmission device, the timing control unit 4 (or 6) transmits the data in the data transmission device to the network (2) without delaying the transmission timing of the data in the data transmission device even if the transmission timing of the data in the data transmission device is close to one transmission timing (the transmission timing of data transmitted in the network (2)) which is recorded in the table in the recording unit 3.

For example, when data received from the network (3) having a higher priority are transmitted to the network (1) having a higher priority as data in the data transmission device, the timing control unit operates in the same way that that according to any one of above-mentioned Embodiments 1 to 3 does because the priority of the data in the data transmission device and the priority of the data transmitted in the network (1) are the same as each other.

The relationship between the priority of an information system network and that of a control system network is only an example in consideration of the general properties of transmission data, and the priorities are not determined uniquely from the distinction between the information system and the control system.

Therefore, there can be a case in which the priority of an information system network is higher than that of a control system network. Furthermore, there can be a difference in priority between control system networks.

As can be seen from the above description, the data transmission device in accordance with this Embodiment 4 is constructed in such a way as to, even when the transmission timing of the data in the data transmission device is close to one transmission timing (one predicted next transmission time) which is recorded in the table in the recording unit 3, delay the transmission timing of the data in the data transmission device only if the data in the data transmission device have a priority lower than that of the data which are to be transmitted with the transmission timing close to the transmission timing of the data in the data transmission device, there is provided an advantage of being able to prevent a situation in which the transmission timing of the data in the data transmission device is delayed unnecessarily from occurring.

Furthermore, because the data transmission device in accordance with this Embodiment 4 is constructed in such a way as to, when the ID assigned to data is expressed by a numerical value showing the priority of the data, compare the numerical values of IDs between two data to determine which one of the two data has a higher priority, in the case in which CAN is used, for example, the data transmission device can determine the priority of data from the ID assigned to the data without providing any new definition for priorities. Therefore, it is not necessary to provide any new definition for priorities between the data transmission device and any other communication device connected to the network, and there is provided another advantage of eliminating the necessity to make a request of any other communication device for addition of a priority setting function based on the definition.

Furthermore, because the data transmission device in accordance with this Embodiment 4 is constructed in such a way as to, in the case in which the network I/F unit 1 (or 5) is connected to a plurality of networks, determine the priority of data from the priority of the network to which the data will be transmitted, there is provided an advantage of being able to determine the priority of data even when the ID assigned to the data does not show a priority.

Embodiment 5

Figure 6:
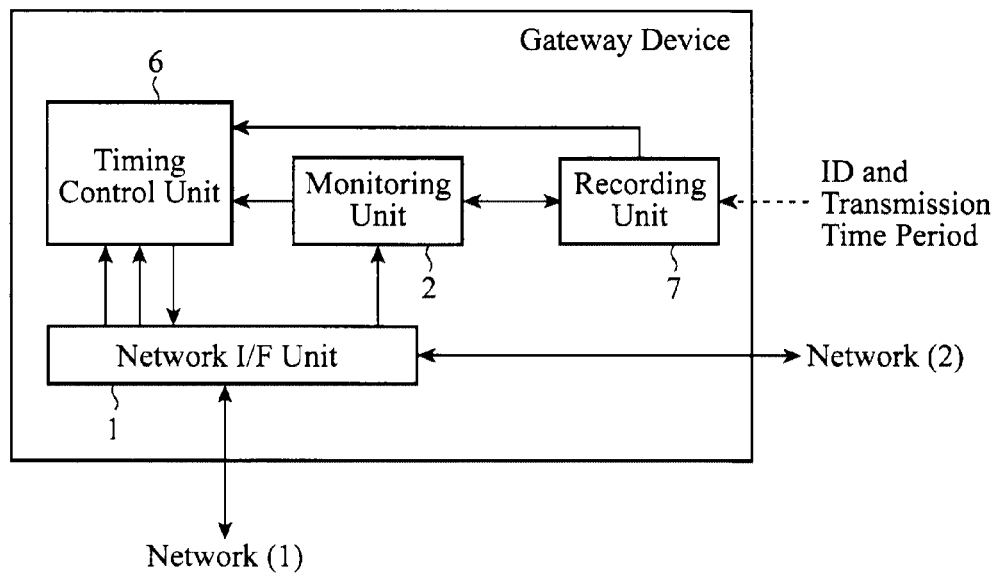
FIG. 6 is a block diagram showing a data transmission device in accordance with Embodiment 5 of the present invention.

FIG. 6 is a block diagram showing a data transmission device in accordance with Embodiment 5 of the present invention.

The data transmission device shown in FIG. 6 is an example of a gateway device which is located between a control system network and an information system network in a vehicle-mounted network. In FIG. 6, because the same reference numerals as those shown in FIG. 5 denote the same components or like components, the explanation of the components will be omitted hereafter.

Although a recording unit 7 is a memory in which a table showing a transmission time period, the newest transmission time, and a predicted next transmission time of data according to the ID of the data is recorded, like the recording unit 3 of FIG. 5, the recording unit 7 differs from the recording unit in that the recording unit 7 receives the ID and the transmission time period of data which are provided thereto from outside the data transmission device in advance, and records them therein in advance.

A transmission timing prediction unit is comprised of a monitoring unit 2 and the recording unit 7.

Next, the operation of the data transmission device will be explained.

In above-mentioned Embodiments 1 to 4, the example in which when receiving a notification of the ID and transmission timing of data from the network I/F unit 1, the monitoring unit 2 records the transmission timing, as the newest transmission time, into the table in the recording unit 3 according to the ID while calculating the transmission time period of the data and recording this transmission time period into the table in the recording unit 3 is shown. As an alternative, the ID and the transmission time period of the data can be provided to the data transmission device from outside the data transmission device in advance, and can be recorded into the table in the recording unit 7.

For example, in a case in which the ID and the transmission time period of data flowing in a network (1) are determined in advance through a development process of developing at least one device connected to the network (1), the ID and the transmission time period of the data are recorded into the table in the recording unit 7 of the gateway device in advance.

In this case, when receiving a notification of the ID and transmission timing of data from the network I/F unit 1, the monitoring unit 2 updates the newest transmission time and the predicted next transmission time of the data which are recorded in the table in the recording unit 7, but does not carry out a calculation and an update of the transmission time period of the data.

Furthermore, even when receiving any notification other than a notification of one ID already recorded in the table in the recording unit 7 from the network I/F unit 1, the monitoring unit 2 neglects the notification.

However, the IDs and transmission time periods which are provided from outside the data transmission device in advance do not need to be information about all the data flowing in the network. More specifically, only the IDs and transmission time periods of some data flowing in the network can be provided.

For example, in a case in which data which the developer desires should not be obstructed by any data transmitted from the gateway device are some data flowing in the network, only the ID and the transmission time period of the data are provided to the data transmission device from outside the data transmission device.

As a result, the gateway device becomes able to include only specific data into the target to be monitored certainly without automatically narrowing down the data to be monitored therewithin, like that according to above-mentioned Embodiment 2.

As can be seen from the above description, the data transmission device in accordance with this Embodiment 5 is constructed in such a way that the recording unit 7 acquires the ID and the transmission time period of data which are being transmitted in the network in advance from outside the data transmission device, and records the ID and the transmission time period into the table, there is provided an advantage of being able to include only specific data into the target to be monitored certainly without automatically narrowing down the data to be monitored within the gateway device while being able to reduce the process of the network I/F unit 1 and that of the monitoring unit 2.

Embodiment 6

In above-mentioned Embodiment 5, although the example in which the recording unit 7 acquires the ID and the transmission time period of data which will be transmitted in a network from outside the data transmission device in advance is shown, the monitoring unit 2 can calculate the transmission time period of the data according to the ID of the data from the transmission timing of the data notified from the network I/F unit 1 in the same way that the monitoring unit according to above-mentioned Embodiment 1 does, compares the transmission time period of the data with the transmission time period of the data which the recording unit has acquired from outside the data transmission device in advance, and, when both the transmission time periods do not coincide with each other, corrects a clock of the data transmission device in such a way that both the transmission time periods coincide with each other.

For example, when for any data, the transmission time period calculated from the transmission timing notified from the network I/F unit 1 is shifted from the transmission time period currently recorded in the table in the recording unit 7 by the same time, the monitoring unit corrects the clock because it is considered that the clock which is the source for creating a transmission timing within the gateway device is shifted in time.

Furthermore, when the time shift between both the transmission time periods is large (when the time shift between both the transmission time periods is equal to or larger than a given time period), the monitoring unit can consider that a trouble has occurred in the network (1) and stop transmission of the data in the data transmission device to the network (1).

As can be seen from the above description, because the data transmission device in accordance with this Embodiment 6 is constructed in such a way as to compare the transmission time period of data acquired from outside the data transmission device in advance with the transmission time period acquired from the transmission timing of the data notified from the network I/F unit 1, and, when both the transmission time periods do not coincide with each other, correct the clock of the data transmission device in such a way that both the transmission time periods coincide with each other, there is provided an advantage of being able to create an appropriate transmission timing even when the accuracy of the clock of the gateway device is low.

Furthermore, because the data transmission device is constructed in such a way as to compare the transmission time period of the data acquired in advance from outside the data transmission device with the transmission time period acquired from the transmission timing of the data notified from the network I/F unit 1, and, when either of both the transmission time periods is equal to or longer than a fixed time period, stop the transmission of the data in the data transmission device to the network (1), there is provided an advantage of being able to grasp the presence or absence of occurrence of a trouble in the network (1), thereby being able to prevent the state of the network (1) from becoming worse.

Embodiment 7

In above-mentioned Embodiment 5, although the example in which the recording unit 7 acquires the ID and the transmission time period of data which will be transmitted in a network from outside the data transmission device in advance is shown, the recording unit can acquire attribution information showing whether or not transmission is carried out not only when the transmission time period varies but also when the value of the data varies.

In this case, the data transmission device according to above-mentioned Embodiment 6 compares the transmission time period acquired from outside the data transmission device in advance with the transmission time period which the monitoring unit 2 has calculated, and corrects the clock and stops transmission of the data in the data transmission device according to the result of the comparison, as shown above. In contrast, when it is determined that the value of the data varies from the above-mentioned attribution information acquired, that is, when it is clear that the data are transmitted with a timing different from the transmission time period, the monitoring unit does not have to promptly determine, as a result of the above-mentioned comparison, that a mismatch between both the transmission time periods results from a shift in time of the clock or the occurrence of a trouble, and can neglect this result.

As can be seen from the above description, in accordance with this Embodiment 7, there is provided an advantage of preventing the occurrence of a clock correction, and also preventing a malfunction, such as a stop of the transmission of the data in the data transmission device, from occurring when it is known in advance that the transmission time period of the data fluctuates.

INDUSTRIAL APPLICABILITY

As mentioned above, because the data transmission device in accordance with the present invention is constructed in such a way as to, in order to be able to transmit data in the data transmission device with a timing which does not obstruct communications of data for which a transmission time period is unknown in advance, include a transmission timing prediction unit for monitoring the transmission time period of data which is notified from a network interface unit, and for predicting a transmission timing with which the data will be transmitted the next time from the transmission time period, the data transmission device in accordance with the present invention is suitable for use as a data transmission device, such as a gateway device located between a control system network and an information system network in a vehicle-mounted network, or the like.

The invention claimed is:

1. A data transmission device comprising:
a network interface unit that carries out a process of transmitting and receiving data to and from a network, and that detects data which are being transmitted in said network and notifies an identifier assigned to said data being transmitted in said network and a transmission timing of said data being transmitted in said network;
a transmission timing prediction unit that monitors, by using the transmission timing and the identifier notified from said network interface unit, a transmission time period of data to which a same identifier is assigned from among the data being transmitted in the network, and that predicts a next transmission timing of said data to which the same identifier is assigned;
a recording unit that stores a table of a plurality of transmission data types, as targets to be monitored, according to an identifier of each transmission data type, said table further including a transmission time period for each transmission data type and the predicted next transmission timing for each transmission data type, said recording unit adding a table entry upon determination that said data being transmitted in said network and data in the data transmission device satisfy a predetermined criteria; and
a transmission timing control unit that delays a transmission timing of said data in the data transmission device when the transmission timing of the data in the data transmission device is within a threshold time difference of a transmission timing predicted by said transmission timing prediction unit stored in said table, and that commands said network interface unit to transmit the data in the data transmission device when the transmission timing of the data in the data transmission device is not within a threshold time difference of said predicted transmission timing.

2. The data transmission device according to claim 1, wherein the transmission timing prediction unit records, into the recording unit as a target to be monitored, a transmission data type notified from said network interface unit of said data being transmitted in said network that satisfies the predetermined criteria of having a transmission time period which is same as either a transmission time period of the data in the data transmission device or a common divisor of the transmission time period of the data in the data transmission device, and monitors the transmission time period of said data having a transmission time period which is same as either a transmission time period of the data in the data transmission device or a common divisor of the transmission time period.

3. The data transmission device according to claim 1, wherein the predetermined criteria is satisfied by said data being transmitted in said network having a higher priority than said data in the data transmission device, and upon determination that said data in the data transmission device must wait for said network to be unoccupied by said data being transmitted in said network before being transmitted, immediately after the network interface unit transmits the data in the data transmission device, the transmission timing prediction unit records, into the recording unit as a target to be monitored, a transmission data type notified from said network interface unit of said data being transmitted in said network that satisfies the predetermined criteria, and monitors a transmission time period of said data being transmitted in said network that satisfies the predetermined criteria.

4. The data transmission device according to claim 1, wherein the predetermined criteria is satisfied by said data being transmitted in said network having a higher priority than said data in the data transmission device, and when transmission of the data in the data transmission device fails, the transmission timing prediction unit records, into the recording unit as a target to be monitored, a transmission data type notified from said network interface unit of said data being transmitted in said network that satisfies the predetermined criteria and monitors a transmission time period of said data being transmitted in said network that satisfies the predetermined criteria.

5. The data transmission device according to claim 1, wherein the transmission timing control unit calculates an occupation time zone in which the network is occupied at a time of transmission of the data in the data transmission device from the network interface unit from both a data length of the data in the data transmission device and a bandwidth of said network, and, when said occupation time zone coincides with a transmission timing predicted by the transmission timing prediction unit stored in said table, determines that the transmission timing of the data in the data transmission device is within a threshold time difference of said predicted transmission timing.

6. The data transmission device according to claim 1, wherein when the transmission timing of the data in the data transmission device is within a threshold time difference of a transmission timing predicted by said transmission timing prediction unit stored in said table, the transmission timing control unit delays the transmission timing of the data in the data transmission device only if the data in the data transmission device have a priority lower than that of data for which the transmission timing is predicted by said transmission timing prediction unit.

7. The data transmission device according to claim 6, wherein the identifiers assigned to data are expressed by a numerical value showing a priority, and the transmission timing control unit makes a comparison between numerical values to determine whether the data in the data transmission device have a higher or lower priority.

8. The data transmission device according to claim 6, wherein in a case in which the network interface unit is connected to a plurality of networks, the transmission timing control unit determines a priority of data from a priority of a network to which said data in the data transmission device will be transmitted.

9. A data transmission device comprising:
a network interface unit that carries out a process of transmitting and receiving data to and from a network, and that detects data which are being transmitted in said network and notifies an identifier assigned to said data being transmitted in said network and a transmission timing of said data being transmitted in said network;
a transmission timing prediction unit that monitors, by using the transmission timing and the identifier notified from said network interface unit, a transmission time period of data to which a same identifier is assigned from among the data being transmitted in the network, and that predicts a next transmission timing of said data to which the same identifier is assigned;
a recording unit that stores a table of a plurality of transmission data types, as targets to be monitored, according to an identifier of each transmission data type, said table further including a transmission time period for each transmission data type and the predicted next transmission timing for each transmission data type; and
a transmission timing control unit that delays a transmission timing of said data in the data transmission device when the transmission timing of the data in the data transmission device is within a threshold time difference of a transmission timing predicted by said transmission timing prediction unit stored in said table, and that commands said network interface unit to transmit the data in the data transmission device when the transmission timing of the data in the data transmission device is not within a threshold time difference of said predicted transmission timing, wherein
the recording unit acquires and stores an identifier and a transmission time period of each of one or more transmission data types which will be transmitted in the network in advance from outside the data transmission device, and does not further acquire identifiers or transmission time periods of transmission data types which will be transmitted in the network after the acquiring in advance from outside the data transmission device.

10. The data transmission device according to claim 9, wherein the transmission timing prediction unit compares the transmission time period of the transmission data type acquired in advance from outside the data transmission device with a transmission time period acquired from the transmission timing of the data notified from the network interface unit having the same transmission data type, and, when both the transmission time periods do not coincide with each other, corrects a clock of the data transmission device in such a way that both the transmission time periods coincide with each other.

11. The data transmission device according to claim 9, wherein the transmission timing prediction unit compares the transmission time period of the transmission data type acquired in advance from outside the data transmission device with a transmission time period acquired from the transmission timing of the data notified from the network interface unit having the same transmission data type, and, when either of both the transmission time periods is equal to or longer than a fixed time period, stops the transmission of the data in the data transmission device to the network.

12. The data transmission device according to claim 9, wherein the transmission timing prediction unit acquires attribution information showing whether or not transmission of the data transmitted in the network is carried out not only when the transmission time period varies but also when a value of the data varies, and, when transmission of the data transmitted in the network is carried out also when the value of the data varies, neglects a result of a comparison between the transmission time period of the transmission data type acquired in advance from outside the data transmission device and a transmission time period acquired from the transmission timing of the data notified from the network interface unit having the same transmission data type.

* * * * *